(12) United States Patent  
Chen et al.

(10) Patent No.: US 9,086,845 B2
(45) Date of Patent: Jul. 21, 2015

(54) FOLIO CASE

(71) Applicant: Superior Communications, Inc., Irwindale, CA (US)

(72) Inventors: George Chen, Chatsworth, CA (US); Mervyn Cheung, Alhambra, CA (US); Soo Youn Park, Tustin, CA (US)

(73) Assignee: Superior Communications, Inc., Irwindale, CA (US)

( * ) Notice: Subject to any disclaimer, the term of this patent is extended or adjusted under 35 U.S.C. 154(b) by 110 days.

(21) Appl. No.: 13/777,958

(22) Filed: Feb. 26, 2013

(65) Prior Publication Data

US 2014/0238876 A1  Aug. 28, 2014

(51) Int. Cl.
*H05K 5/03* (2006.01)
*A45C 11/00* (2006.01)
*G06F 1/16* (2006.01)

(52) U.S. Cl.
CPC ............ *G06F 1/1626* (2013.01); *G06F 1/1628* (2013.01); *A45C 2011/002* (2013.01); *A45C 2011/003* (2013.01); *G06F 2200/1633* (2013.01)

(58) Field of Classification Search
CPC ................. H04B 1/3888; A45C 11/00; A45C 2011/002; A45C 2011/003
USPC ................ 206/722, 45.2, 320, 310, 309, 312, 206/45.24; 361/679.55, 679.56, 679.21; 455/575.1, 575.8, 575.3; 281/49; 16/223, 221; 446/487, 491, 489; 402/73, 77, 62; 379/433.11, 433.12, 379/433.13, 600
See application file for complete search history.

(56) References Cited

U.S. PATENT DOCUMENTS

| | | | | |
|---|---|---|---|---|
| 1,640,399 | A * | 8/1927 | Druck | 273/155 |
| 2,133,155 | A * | 10/1938 | Stevens | 40/446 |
| 2,245,875 | A * | 6/1941 | Rutherford | 446/487 |
| 2,809,467 | A * | 10/1957 | St Pierre et al. | 446/487 |
| 3,530,614 | A * | 9/1970 | Strongin | 446/487 |
| 4,095,366 | A * | 6/1978 | Buck et al. | 446/487 |
| 4,183,166 | A * | 1/1980 | Borner | 446/487 |
| 4,558,911 | A * | 12/1985 | Ruoff | 439/13 |
| 4,619,304 | A * | 10/1986 | Smith | 160/135 |
| 4,940,068 | A * | 7/1990 | Pokorny et al. | 150/132 |
| 5,128,829 | A * | 7/1992 | Loew | 361/679.3 |
| D331,483 | S * | 12/1992 | Travis et al. | D3/250 |
| 5,615,765 | A * | 4/1997 | Roericht | 206/45.23 |
| 5,628,670 | A * | 5/1997 | Hill | 446/487 |
| 5,701,696 | A * | 12/1997 | Clontz | 40/642.02 |
| 6,276,414 | B1 * | 8/2001 | Bibb | 150/132 |
| 6,536,764 | B1 * | 3/2003 | Spitzer | 273/153 S |
| 6,729,467 | B1 * | 5/2004 | King | 206/5 |

(Continued)

FOREIGN PATENT DOCUMENTS

GB 2189290 * 3/1987 ............... E05D 1/00

*Primary Examiner* — Robert J Hicks
*Assistant Examiner* — Gideon Weinerth
(74) *Attorney, Agent, or Firm* — Snell & Wilmer LLP

(57) ABSTRACT

An apparatus and/or systems related to a case for a mobile device. The case may include a holding shell attached to a cover shell by a strap hinge. The strap hinge includes a plurality of straps attached to alternating sides of the holding shell and the cover shell. The strap hinge may be opened from a left side or a right side of the holding shell. When opened from the left side, a first surface of the plurality of straps is exposed. When opened from the right side, a second surface of the plurality of straps is exposed, the second surface having a different color than the first surface. The strap hinge allows the case to change colors without swapping parts.

20 Claims, 17 Drawing Sheets

(56) References Cited

U.S. PATENT DOCUMENTS

| | | | | |
|---|---|---|---|---|
| 6,772,879 B1 * | 8/2004 | Domotor | | 206/45.23 |
| 7,412,995 B2 * | 8/2008 | Arcese | | 150/103 |
| 7,460,893 B2 * | 12/2008 | Aarras | | 455/575.3 |
| 7,621,398 B2 * | 11/2009 | Sugibuchi | | 206/450 |
| 7,787,912 B2 * | 8/2010 | Saila | | 455/575.1 |
| 8,016,107 B2 * | 9/2011 | Emsky | | 206/320 |
| D650,781 S * | 12/2011 | Rashid et al. | | D14/341 |
| 8,132,670 B1 * | 3/2012 | Chen | | 206/320 |
| 8,201,687 B2 * | 6/2012 | Zeliff et al. | | 206/320 |
| 8,281,924 B2 * | 10/2012 | Westrup | | 206/320 |
| D684,978 S * | 6/2013 | Phillips et al. | | D14/440 |
| 8,467,183 B2 * | 6/2013 | Probst et al. | | 361/679.55 |
| 8,763,795 B1 * | 7/2014 | Oten et al. | | 206/45.23 |
| 8,804,324 B2 * | 8/2014 | Bohn et al. | | 361/679.27 |
| 2008/0137271 A1 * | 6/2008 | Saila | | 361/680 |
| 2009/0230004 A1 * | 9/2009 | Bray et al. | | 206/257 |
| 2009/0230161 A1 * | 9/2009 | Emsky | | 224/257 |
| 2010/0110629 A1 * | 5/2010 | Dietz et al. | | 361/679.55 |
| 2010/0122924 A1 * | 5/2010 | Andrews | | 206/320 |
| 2010/0227529 A1 * | 9/2010 | Riley | | 446/487 |
| 2010/0294909 A1 * | 11/2010 | Hauser et al. | | 248/456 |
| 2011/0221319 A1 * | 9/2011 | Law et al. | | 312/325 |
| 2011/0226639 A1 * | 9/2011 | Bray et al. | | 206/256 |
| 2011/0291969 A1 * | 12/2011 | Rashid et al. | | 345/173 |
| 2012/0008269 A1 * | 1/2012 | Gengler | | 361/679.09 |
| 2012/0012483 A1 * | 1/2012 | Fan | | 206/320 |
| 2012/0176741 A1 * | 7/2012 | Wu et al. | | 361/679.09 |
| 2012/0217174 A1 * | 8/2012 | Ting | | 206/45.2 |
| 2013/0079066 A1 * | 3/2013 | Chan | | 455/575.1 |
| 2013/0098782 A1 * | 4/2013 | Diebel et al. | | 206/45.25 |
| 2013/0175200 A1 * | 7/2013 | Poon et al. | | 206/759 |
| 2013/0213838 A1 * | 8/2013 | Tsai et al. | | 206/320 |
| 2013/0248393 A1 * | 9/2013 | Bray et al. | | 206/256 |
| 2013/0264459 A1 * | 10/2013 | McCosh et al. | | 248/688 |
| 2014/0061071 A1 * | 3/2014 | Kim | | 206/45.2 |
| 2014/0061084 A1 * | 3/2014 | Westrup et al. | | 206/472 |
| 2014/0216971 A1 * | 8/2014 | Ashley et al. | | 206/472 |

* cited by examiner

FOLIO CASE

BACKGROUND

1. Field

The present disclosure relates to an apparatus and/or systems related to a case for a mobile device. The case may include a holding shell connected to a cover shell by a strap hinge.

2. Description of Related Art

Mobile devices such as smartphones, tablet computers (or "tablets") and the like are gaining widespread popularity. For example, millions of the Apple® iPhone® and the Apple® iPad® have been sold to date. The success of other major competitors such as Motorola®, Samsung®, HTC®, etc. only further confirms that consumers have adopted mobile devices. Consumers wish to protect and enhance the functionality of their products. Accordingly, manufacturers have produced different cases and other accessories to help the consumer keep their mobile devices safe.

However, certain of these cases do not provide all of the functionality that a user may desire. Users may desire a case which can substantially cover and protect an entirety of the mobile device. Users may wish to change colors of a case without replacing the case or portions of it. Users may also wish for more flexibility in orienting or propping up the mobile device. For example, users may wish for an adjustable viewing angle. Users may further wish for a stable typing angle so that the user may type on the mobile device.

SUMMARY

The present disclosure relates to an apparatus and/or systems related to a case for a mobile device. The case includes a holding shell attached to a cover shell by a strap hinge. The strap hinge includes a plurality of straps. Depending on how the strap hinge is opened, a first or a second surface of the plurality of straps may be exposed to allow different colors to be visible.

BRIEF DESCRIPTION OF THE DRAWINGS

The features, obstacles, and advantages of the present disclosure will become more apparent from the detailed description set forth below when taken in conjunction with the drawings herein, wherein.

DETAILED DESCRIPTION

Figure 1A:
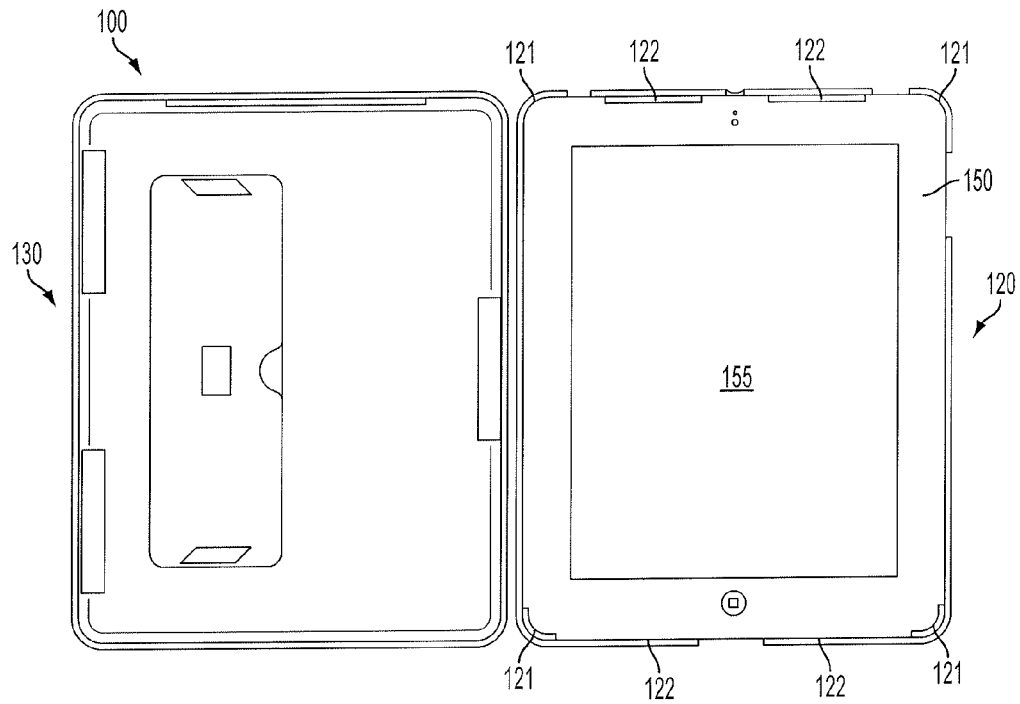
FIG. 1A illustrates a tablet housed within a case in an open position according to one implementation of the present disclosure.

Apparatus, systems and/or methods that implement the implementations of the various features of the present disclosure will now be described with reference to the drawings. The drawings and the associated descriptions are provided to illustrate some implementations of the present disclosure and not to limit the scope of the present disclosure. Throughout the drawings, reference numbers are re-used to indicate correspondence between referenced elements.

FIGS. 1A-1D illustrate an exemplary implementation of a case 100 housing a tablet 150 while in an open position to expose a screen 155. The case 100 includes a holding shell 120 attached to a cover shell 130 through a strap hinge 140 (in FIG. 1B). The strap hinge 140 is formed from straps 145A-C in FIG. 1C. The straps 145A-C alternate, as will be discussed further below. The holding shell 120 receives the tablet 150 without blocking a screen 155 of the tablet 150. The holding shell 120 includes a corner lip 121 and an edge lip 122, which holds the tablet 150 in place within the holding shell 120. The friction between the form-fitting holding shell 120 and the tablet 150 further holds the tablet 150 in place. Alternatively, other mechanisms known in the art may be utilized to hold the tablet 150 in place.

Figure 1B:
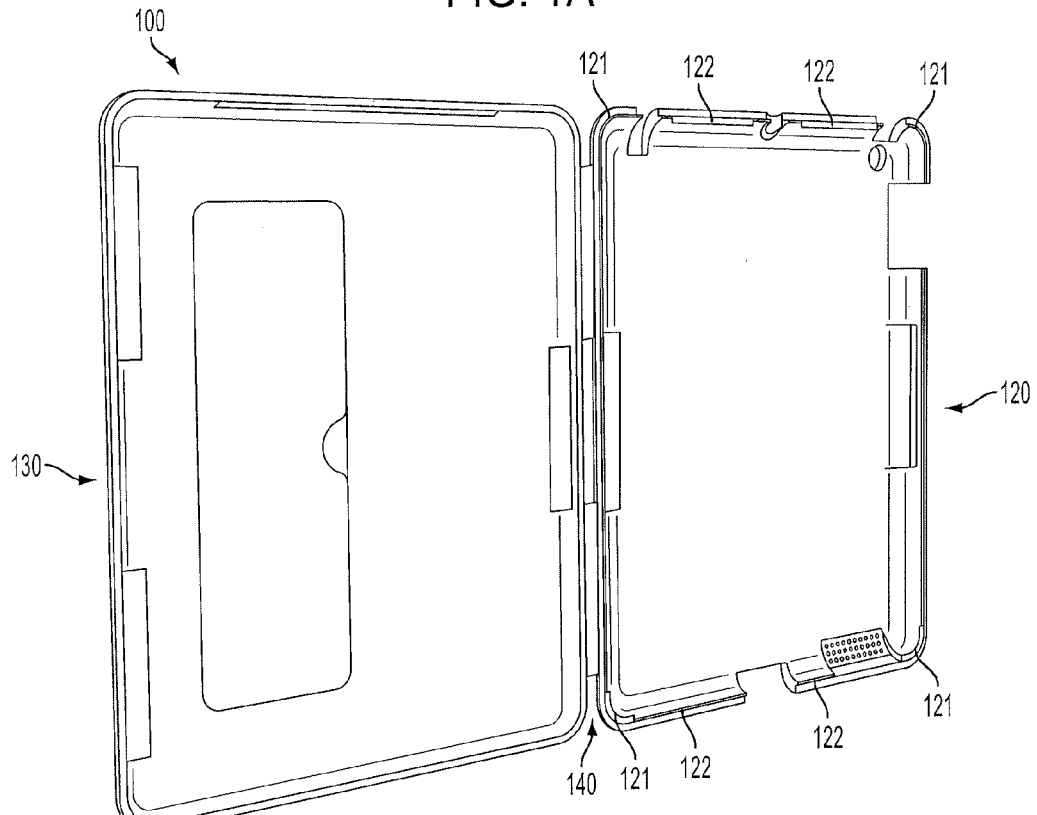
FIG. 1B illustrates the case in an open position without the tablet according to one implementation of the present disclosure.
Figure 1C:
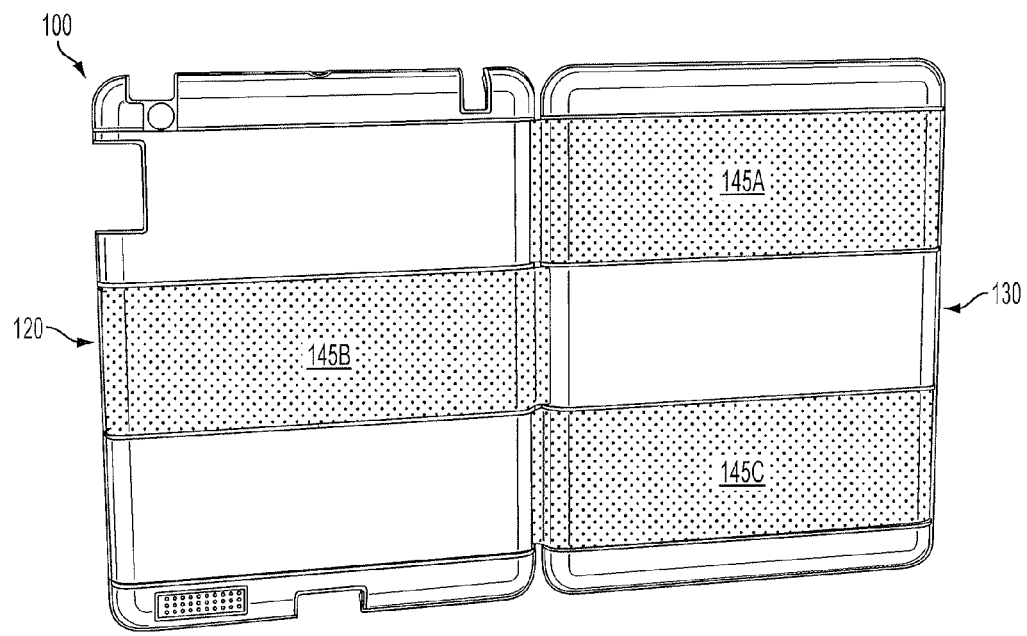
FIG. 1C illustrates a back view of the case in an open position without the tablet according to one implementation of the present disclosure.
Figure 1D:
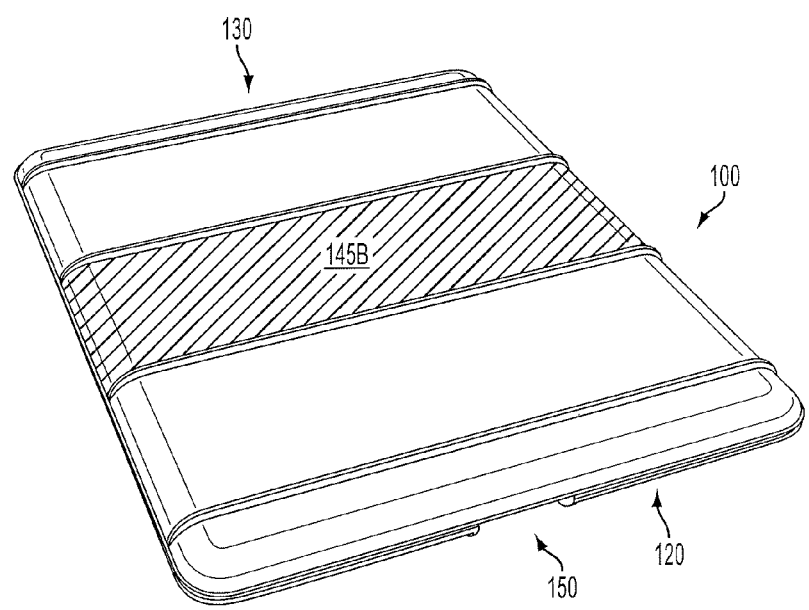
FIG. 1D illustrates the tablet within the case in a closed position according to one implementation of the present disclosure.

FIG. 1D illustrates the case 100 housing the tablet 150 while in a closed position. When the case 100 is fully closed, the case 100 substantially covers an entirety of the tablet 150. The cover shell 130 closes over the screen 155 of the tablet 150. As seen in FIG. 1D, when the case 100 is closed, the holding shell 120 meets with the cover shell 130 to substantially envelope the tablet 150 in the cavity between the holding shell 120 and the cover shell 130. In addition, the inside of the case 100 may be lined with felt or other suitable material for providing extra cushioning and protection against scratches. As further seen in FIG. 1D, straps 145A-C can be alternatively arranged to expose a surface having a different color or pattern. In FIG. 1D, strap 145B displays a different color compared to, straps 145A-C in FIG. 1C.

Figure 2A:
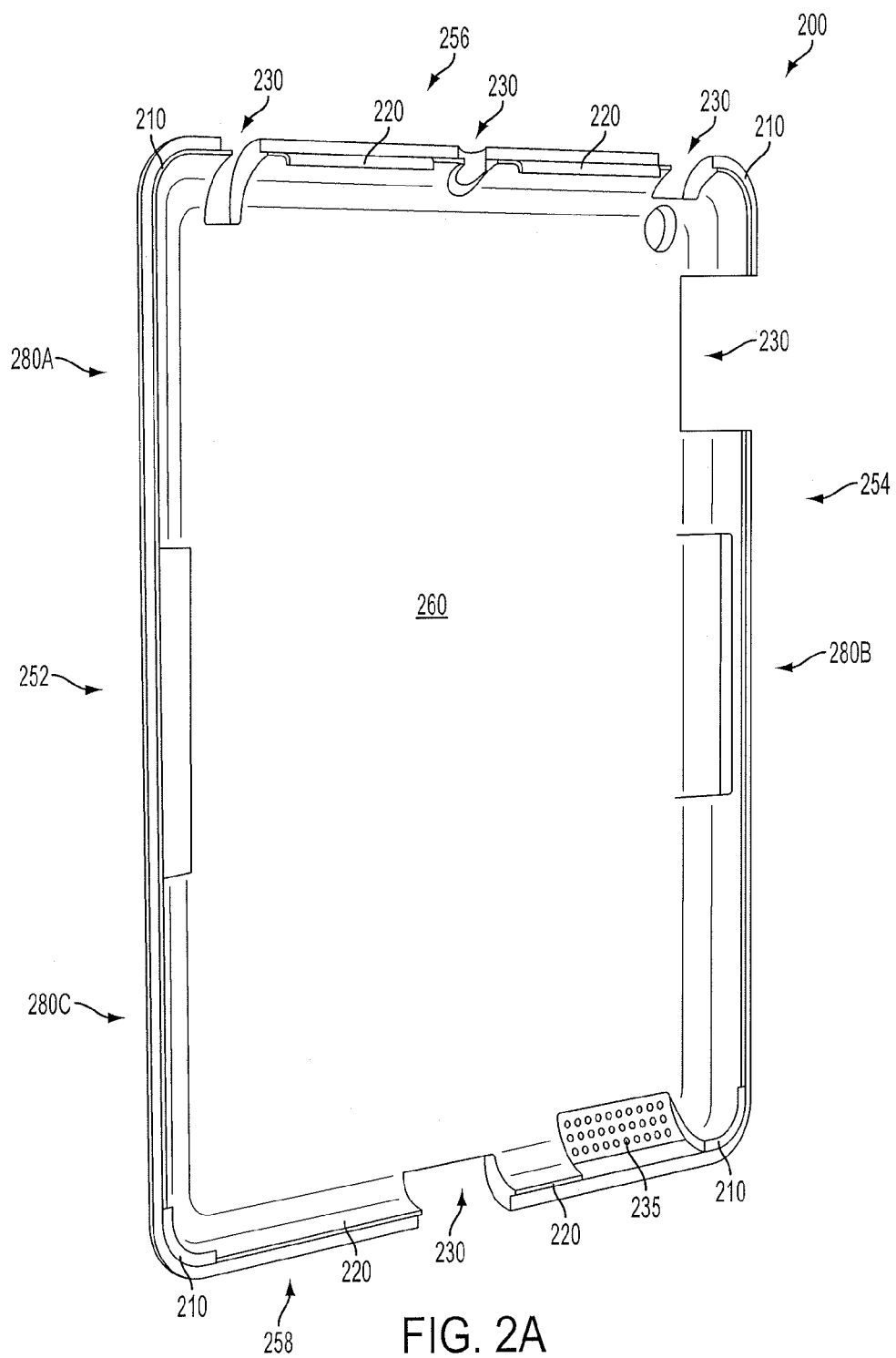
FIG. 2A illustrates a front view of a holding shell of the case according to one implementation of the present disclosure.
Figure 2B:
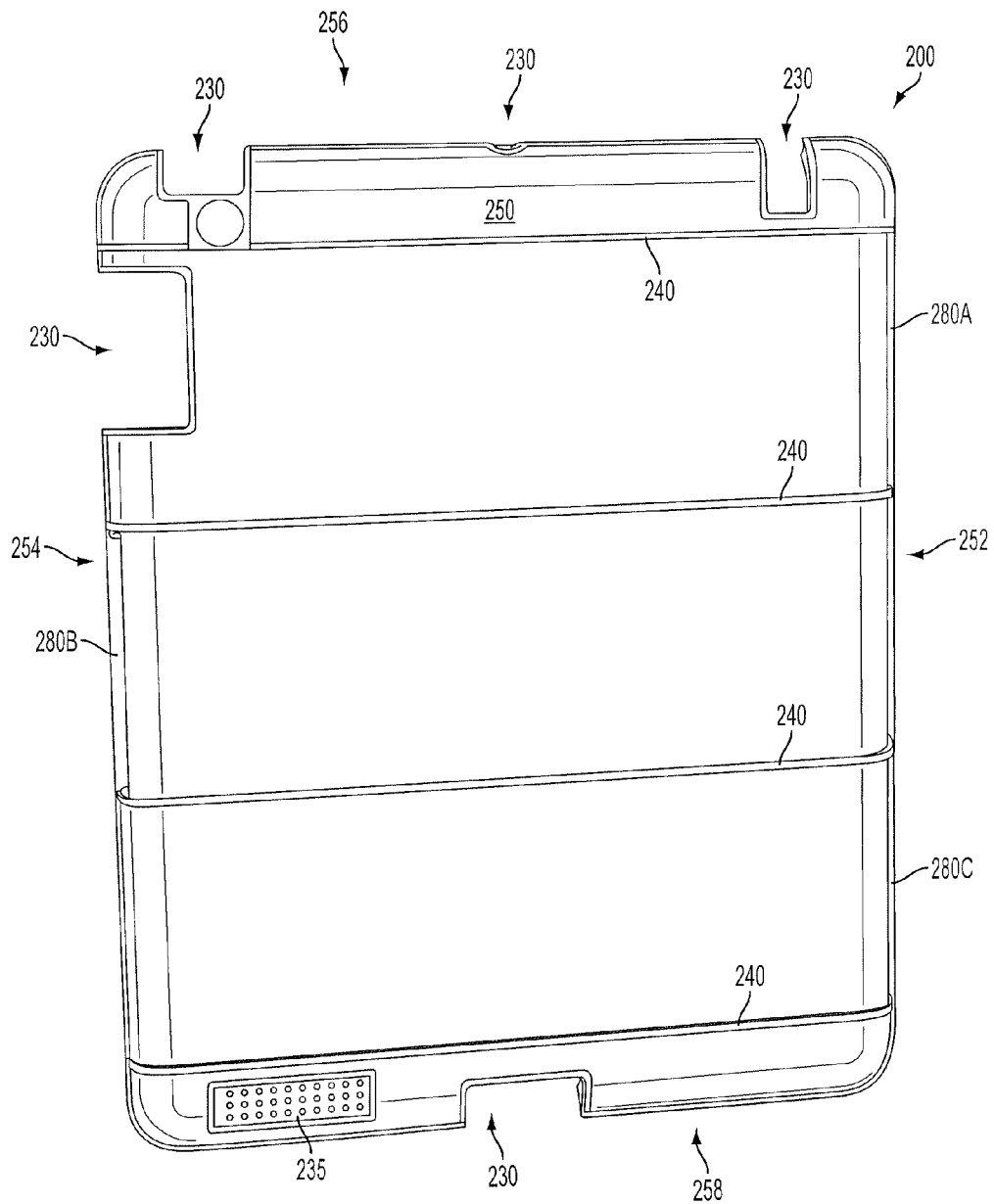
FIG. 2B illustrates a back view of the holding shell of the case according to one implementation of the present disclosure.

FIGS. 2A-B depict a holding shell 200, which may correspond to the holding shell 120 of FIG. 1A-1C. The form fitting shape of the holding shell 200, formed from a back side 250 having a left side 252, a right side 254, a top side 256, and a bottom side 258 protruding therefrom, allows the holding shell 200 to wrap around the body of the tablet 150 while leaving the screen 155 open or uncovered. The friction between the holding shell 200 and the tablet 150 may be sufficient to hold the tablet 150 within the holding shell 200 without the tablet 150 falling out. An inner side 260 may be lined with material, such as felt, to provide added padding. As seen in FIG. 2, the holding shell 200 may also include corner lips 210 in the corners and edge lips 220 along the left side 252, the right side 254, the top side 256, and the bottom side 258, respectively. The corner lips 210 and the edge lips 220 hold the tablet 150 in place by preventing the tablet 150 from falling out.

The holding shell 200 also includes cutout portions 230. The cutout portions 230 provide access to various ports, buttons, switches, cameras, etc. on the tablet 150. A grille 235 provides protection to audio elements of the tablet 150, such as a microphone or a speaker, without impeding sound.

A plurality of rails 240 spans a width of the holding shell 200. The plurality of rails 240 are disposed on the back side 250, spanning from the left side 252 to the right side 254. The plurality of rails 240 are configured to provide guiding support for the straps 145A-C. The plurality of rails 240 are spaced apart to accommodate the width of each of straps 145A-C. In FIG. 2B, four rails 240 accommodate three straps 145A-C. However, the holding shell 200 may include an appropriate number of rails 240 to accommodate any number of straps 145, such as one more rail 240 than straps 145.

A plurality of grooves 280 provide anchor points for attaching the straps 145A-C. The grooves 280 are generally aligned between the plurality of rails 240. In FIG. 2, the right side 254 has one groove 280, and the left side 252 has two grooves 280. Similar to the straps 145A-C, the grooves 280 alternate. The top strap 145A attaches to the groove 280A along the left side 252 near the top side 256. The middle strap 145B attaches to the groove 280B along the right side 254 near the middle of the holding shell 200. The bottom strap 145C attaches to the groove 280C along the left side 252 near the bottom side 258. The alternating arrangement of the straps 145 allows for the versatility of the strap hinge 140, which will be discussed further below.

Figure 3A:
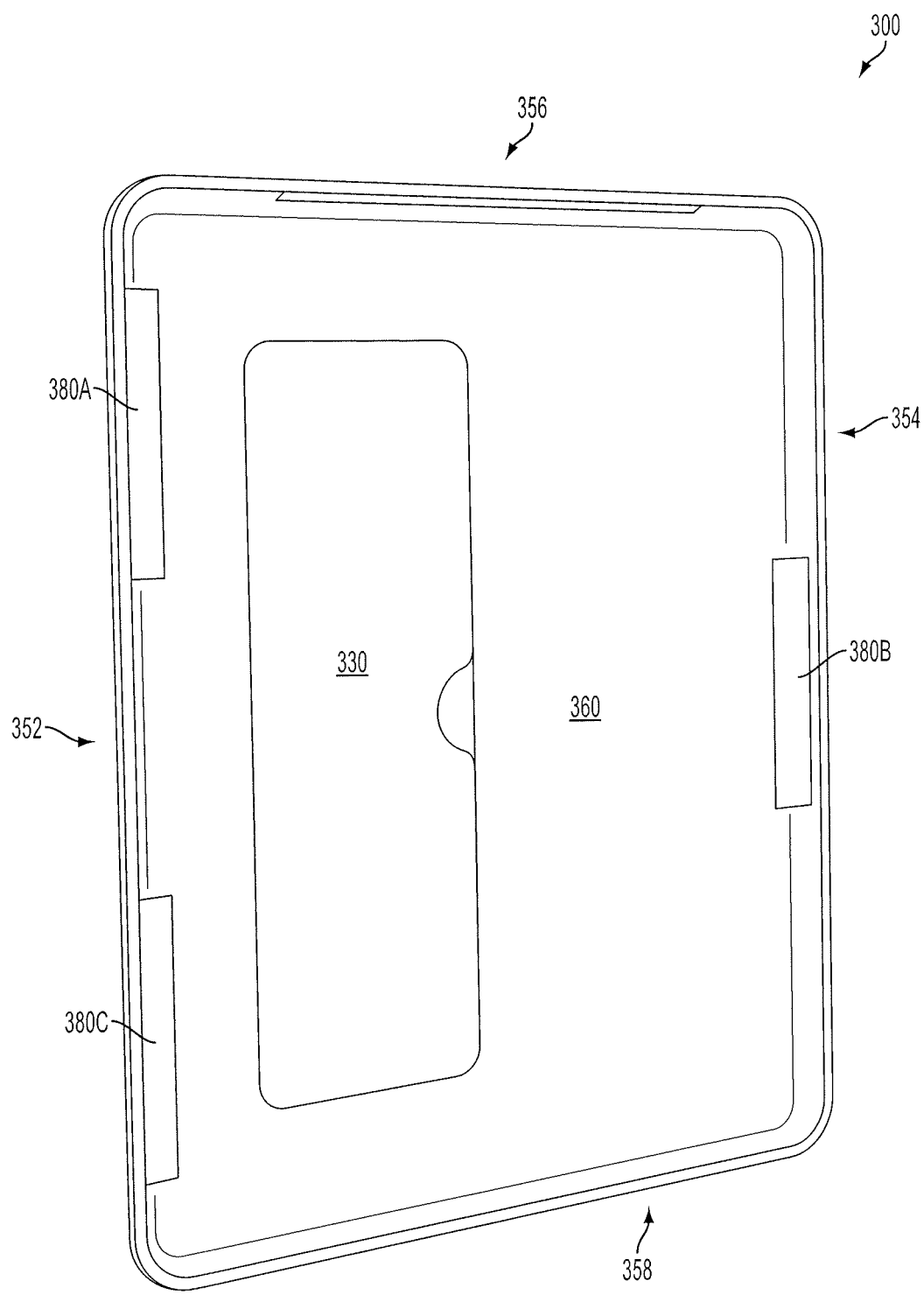
FIG. 3A illustrates a front view of a cover shell of the case according to one implementation of the present disclosure.
Figure 3B:
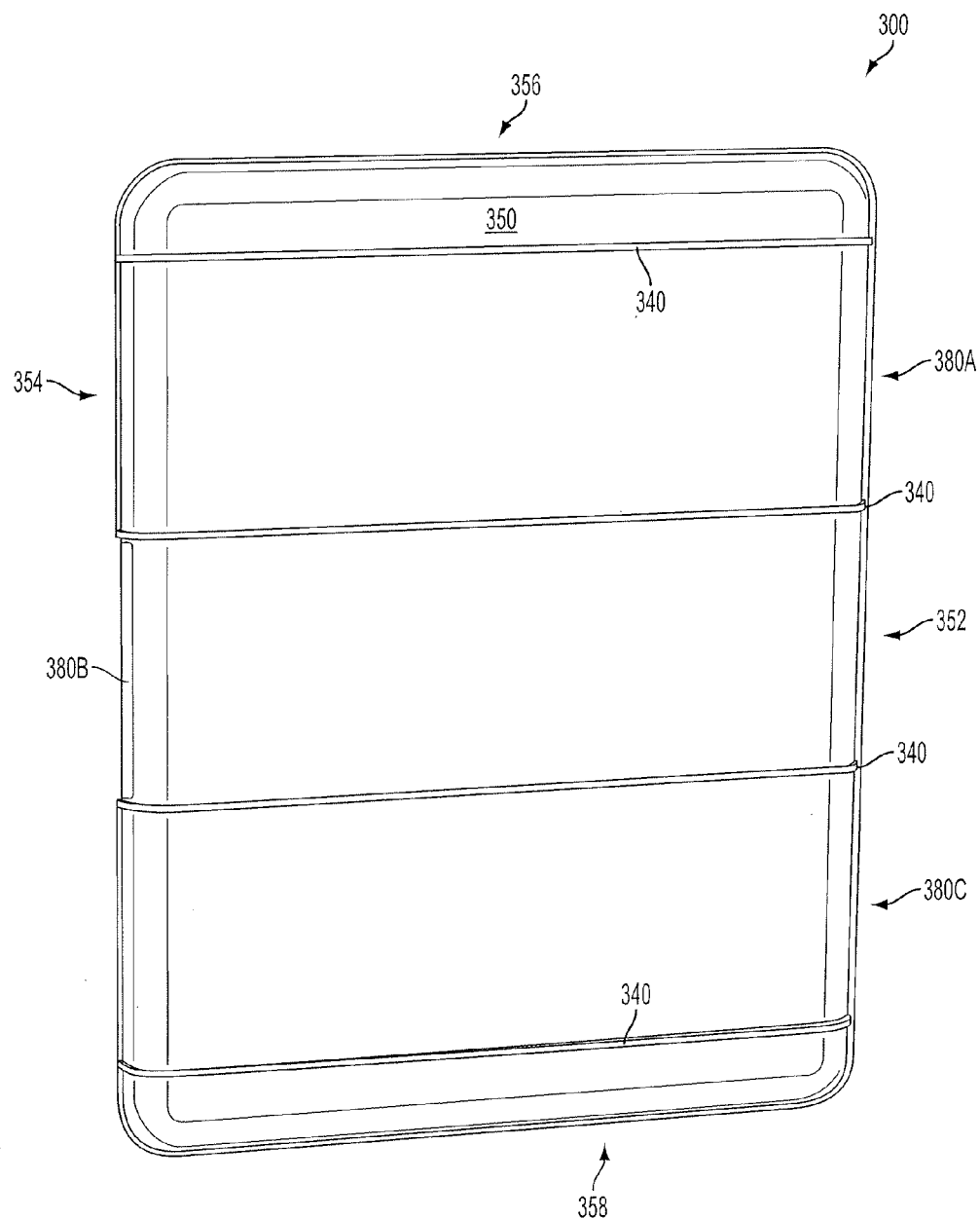
FIG. 3B illustrates a back view of the cover shell of the case according to one implementation of the present disclosure.

FIGS. 3A-3B illustrate a cover shell 300, which may correspond to the cover shell 130. A shape of the cover shell 300 may generally mirror a shape of the holding shell 200. This general symmetry between the two shells of the case 100 provides a cavity to encapsulate the tablet 150 when the case 100 is fully closed. As seen in FIGS. 3A-B, the cover shell 300 includes a back side 350, a left side 352, a right side 354, a top side 356, and a bottom side 358. When the case 100 is fully closed (e.g., FIG. 1D), the left side 352, the right side 354, the top side 356, and the bottom side 358 meets and aligns with the right side 254, the left side 252, the top side 256, and the bottom side 258, respectively, of the holding shell 200. The cover shell 300 provides protection to the screen 155 as well as other portions of the tablet 150 which are not covered by the holding shell 200. An inner side 360 may be lined with felt or other suitable material to provide padding and prevent scratching of the screen 155.

Figure 6:
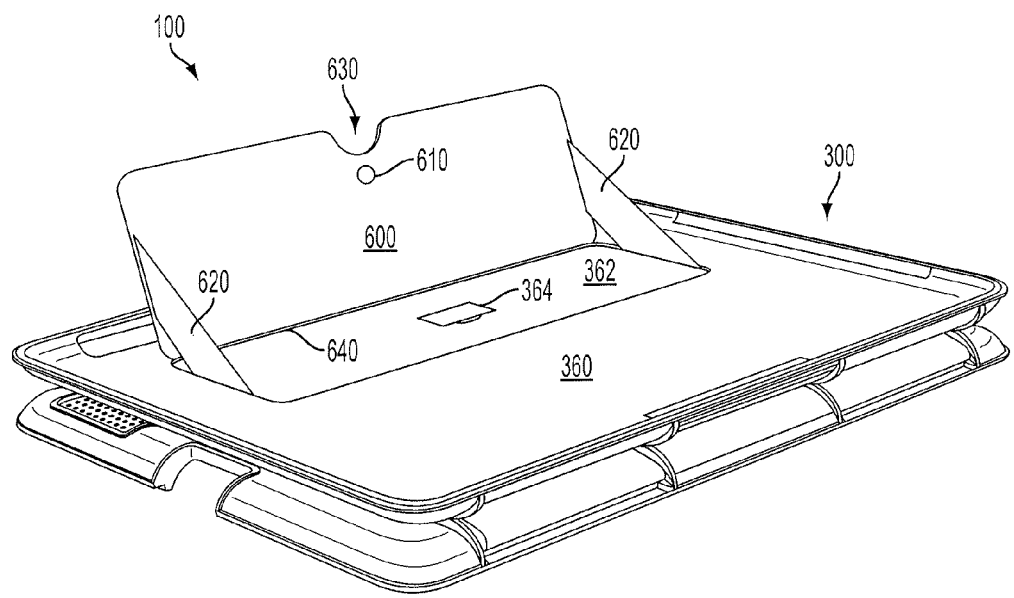
FIG. 6 illustrates a kickstand of the case according to one implementation of the present disclosure.

A kickstand 330 is disposed opposite the back side 350. In FIG. 3, the kickstand 330 is closed. When open, the kickstand 330 provides support for a typing angle, as seen in FIG. 6.

The cover shell 300 further includes a plurality of rails 340. Similar to the plurality of rails 240, the plurality of rails 340 are arranged to accommodate the straps 145. A plurality of grooves 380 are also arranged along the left side 352 and the right side 354 between the plurality of rails 340. The top strap 145A attaches to the groove 380A along the left side 352 near the top side 356. The middle strap 145B attaches to the groove 380B along the right side 354 near the middle of the cover shell 300. The bottom strap 145C attaches to the groove 380C along the left side 352 near the bottom side 358. Similar to the holding shell 200, the cover shell 300 includes 4 rails 340 to accommodate 3 straps 145. However, the cover shell 300 may include an appropriate number of rails 340 for any number of straps 145, such as one more rail 340 than straps 145.

Figure 4A:
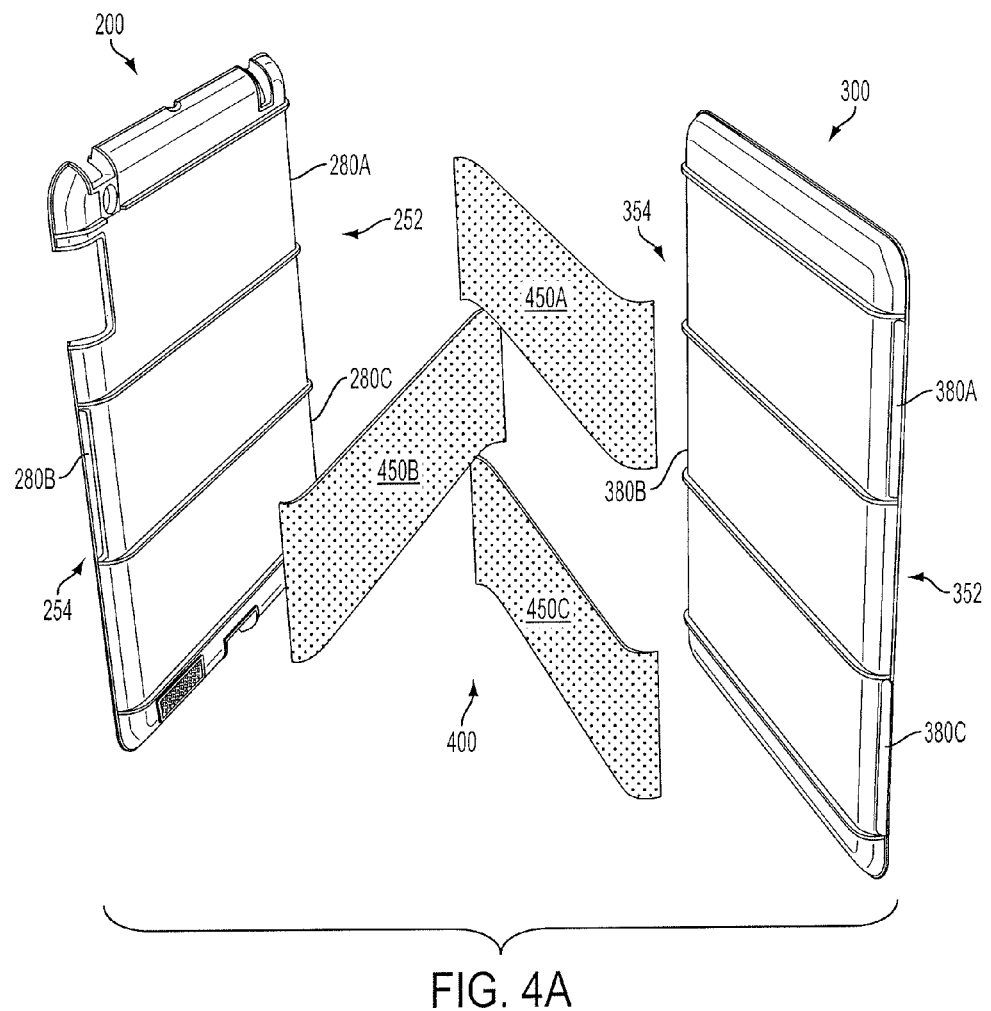
FIG. 4A illustrates an exploded view of a strap hinge of the case according to one implementation of the present disclosure.
Figure 4B:
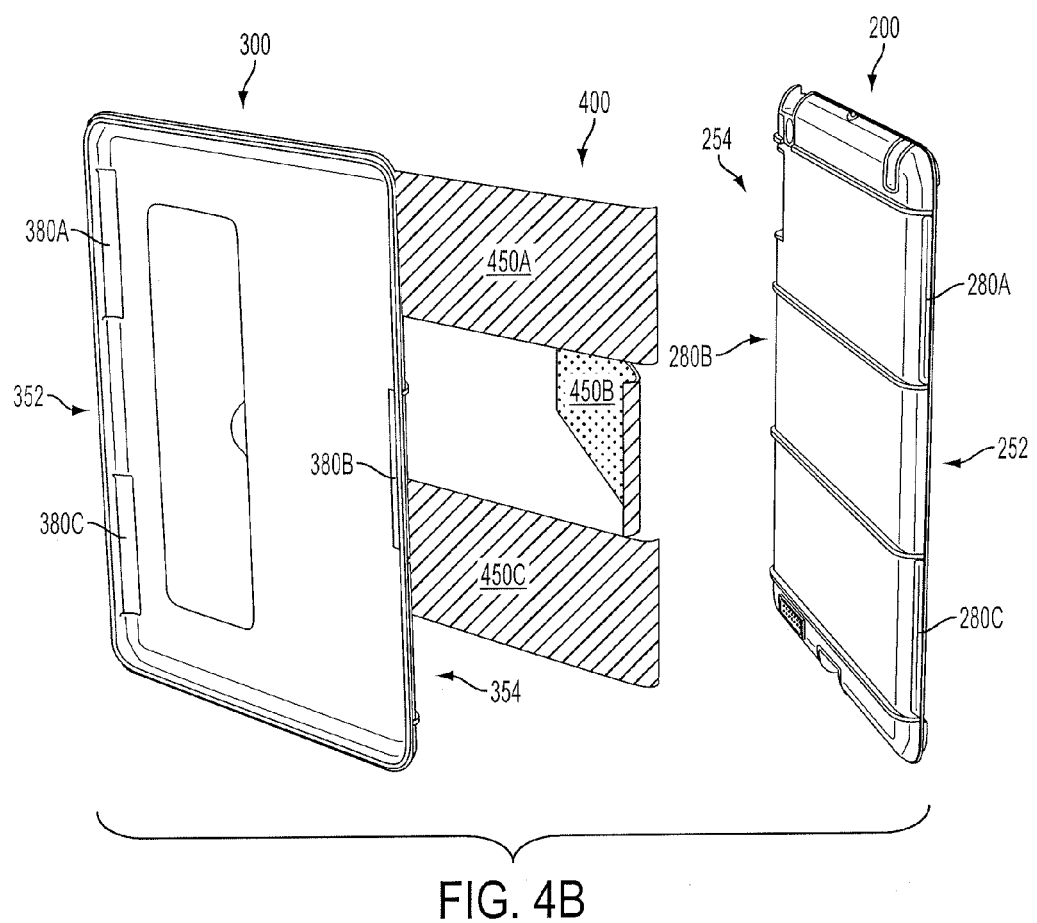
FIG. 4B illustrates a reverse view of the case in FIG. 4A according to one implementation of the present disclosure.

FIGS. 4A-B presents an exploded view of the case 100. A strap hinge 400 includes straps 450, which may correspond to the strap hinge 140 and the straps 145, respectively. The strap 450A attaches to the groove 380A and the groove 280A. The strap 450B attaches to the groove 380B and the groove 280B. The strap 450C attaches to the groove 380C and the groove 280C. This alternating arrangement of the straps 450 allows the case 100 to be opened from the left side 252 or the right side 254 when the case 100 is in the fully opened position. As seen in FIGS. 4A and 4B, the straps 450A-C may have different colors or patterns on their opposite surfaces.

Figure 5A:
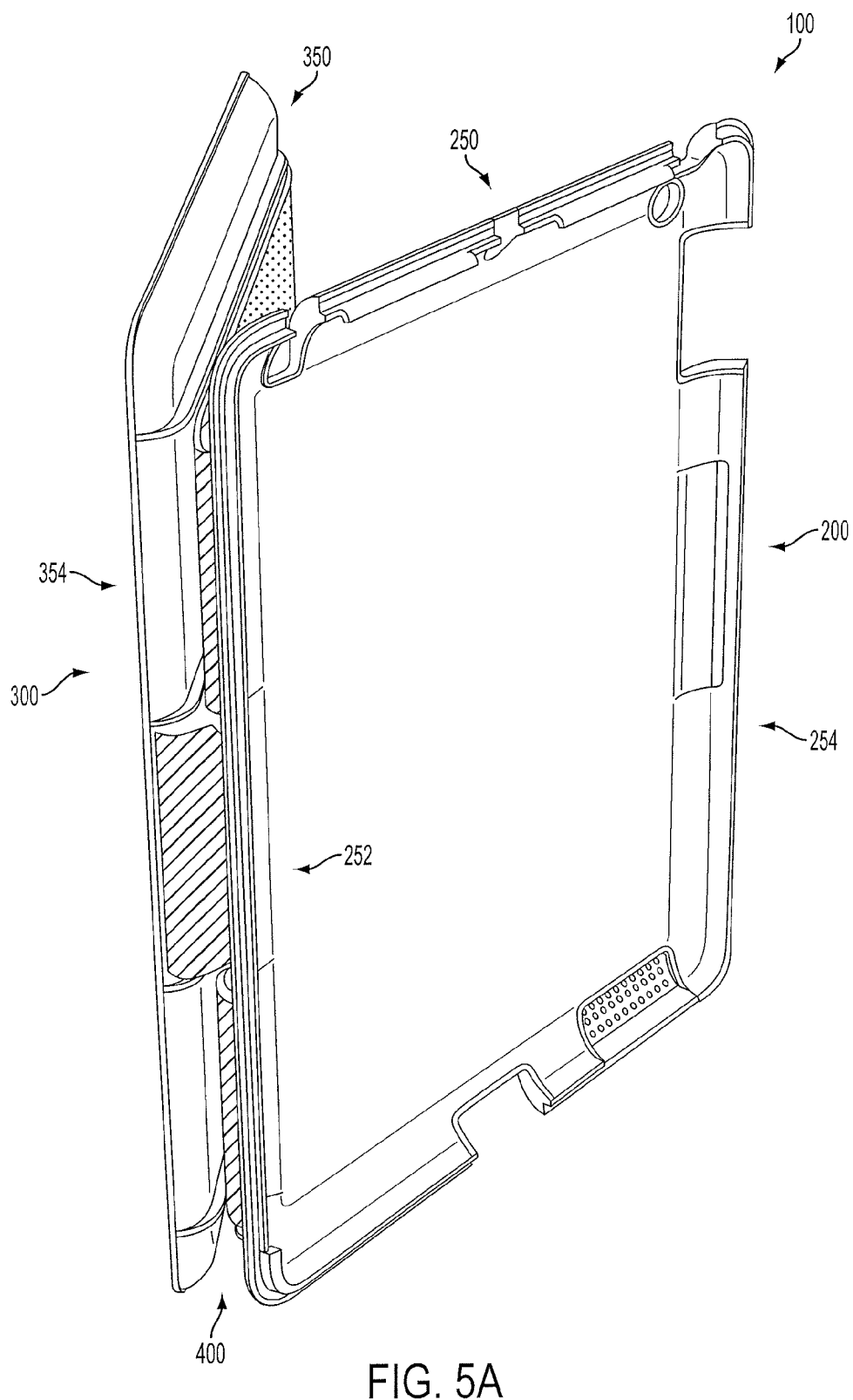
FIG. 5A illustrates the case in a fully opened position according to one implementation of the present disclosure.

FIG. 5A illustrates the case 100 nearly in the fully opened position. In the fully opened position, the back side 250 of the holding shell 200 and the back side 350 of the cover shell 300 meet and face each other. The straps 450 lay flat across both the back side 250 and the back side 350. Because the straps 450 do not connect the adjacent sides of the holding shell 200 and the cover shell 300 (e.g., the left side 252 to the right side 354 or the right side 254 to the left side 352) the strap hinge 400 can be opened from the left side 252 or the right side 254.

Figure 5B:
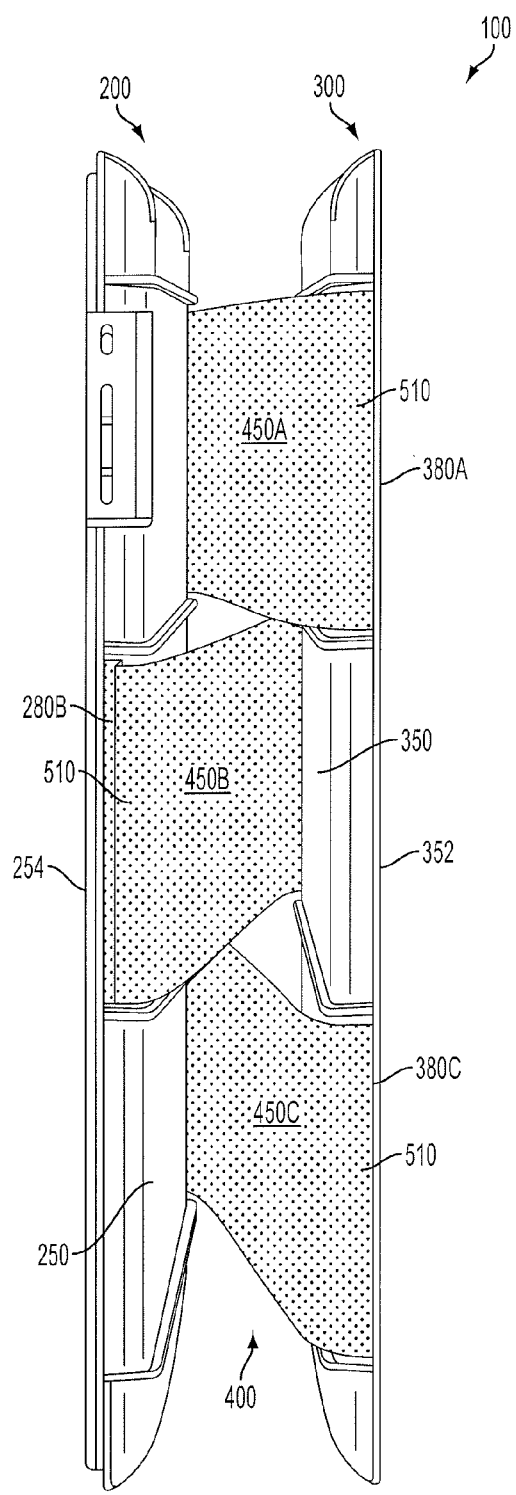
FIG. 5B illustrates the case opened from a right side of the holding shell according to one implementation of the present disclosure.
Figure 5C:
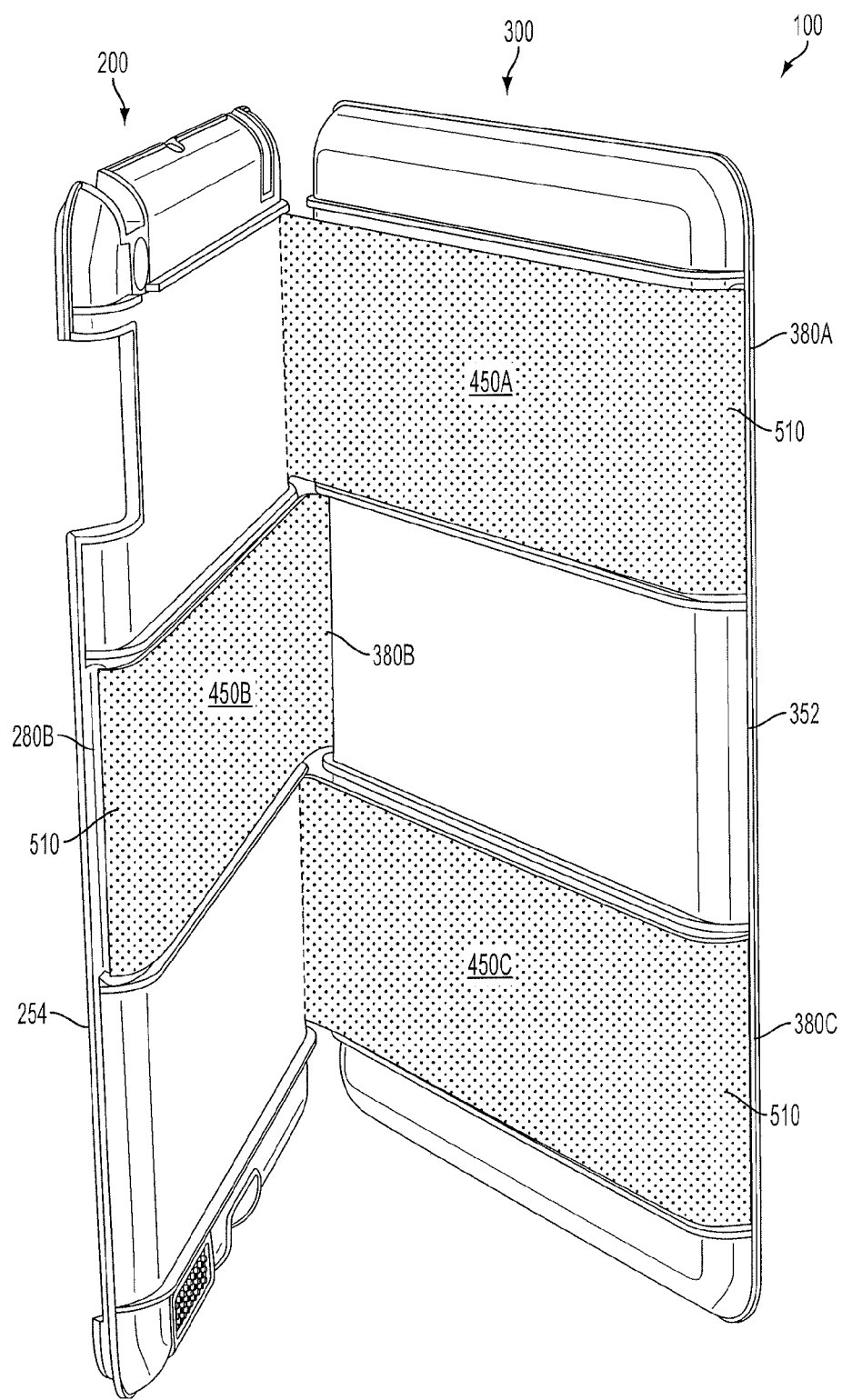
FIG. 5C illustrates the case in FIG. 5B opened further from the right side of the holding shell according to one implementation of the present disclosure.

When opened from the right side 254 of the holding shell 200, as seen in FIG. 5B, the groove 280B along the left side 252 and the grooves 380A and 380C along the right side 356 are separated. Accordingly, the strap 450B, connected to the groove 280B, is pulled away from the straps 450A and 450C, connected to the grooves 380A and 380C, respectively. The strap 450B remains generally disposed along the back side 250 of the holding shell 200 while the straps 450A and 450C remain generally disposed along the back side 350 of the cover shell 300, as seen more clearly in FIG. 5C. As a result, first surfaces 510 of the straps 450 are exposed.

Figure 5D:
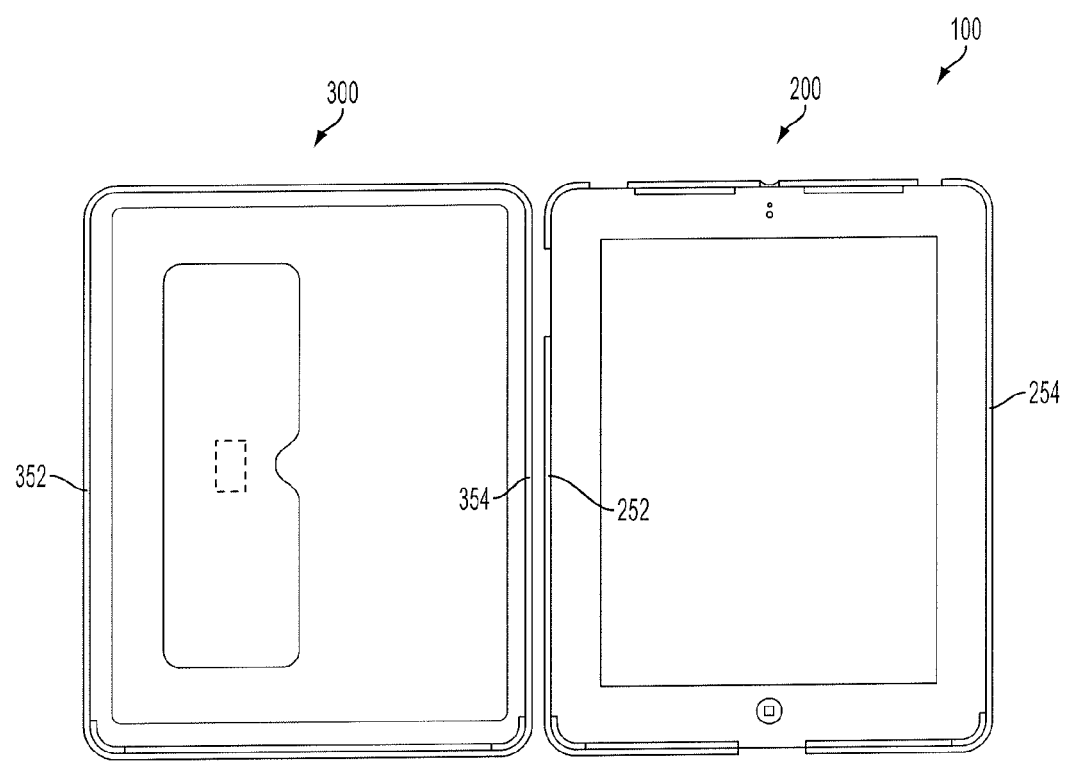
FIG. 5D illustrates the case in FIG. 5B opened and holding the tablet according to one implementation of the present disclosure.

FIG. 5D shows that when opened flat from the right side 254, the case 100 opens such that the holding shell 200 is disposed to the right of the cover shell 300. In other words, the left side 252 of the holding shell 200 meets the right side 354 of the cover shell 300.

Figure 5E:
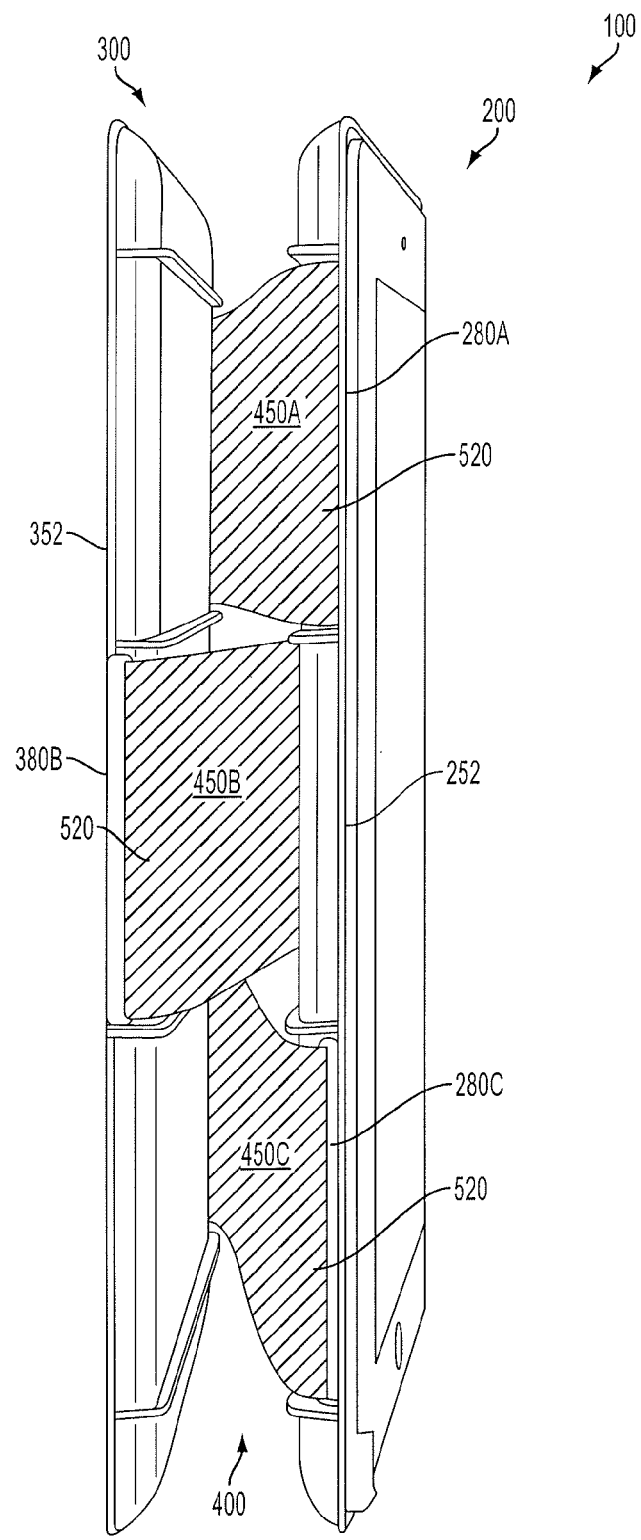
FIG. 5E illustrates the case opened from a left side of the holding shell according to one implementation of the present disclosure.

When opened from the left side 252 of the holding shell 200, as seen in FIG. 5E, the grooves 280A and 280C along the left side 252 and the groove 380B along the right side 354 are separated. Accordingly, the straps 450A and 450C, connected to the grooves 280A and 280C respectively, are pulled away from the strap 450B, connected to the groove 380B. The straps 450A and 450C remain generally disposed along the back side 250 of the holding shell 200 while the strap 450B remains generally disposed along the back side 350 of the cover shell 300. As a result, second surfaces 520 of the straps 450 are exposed.

Figure 5F:
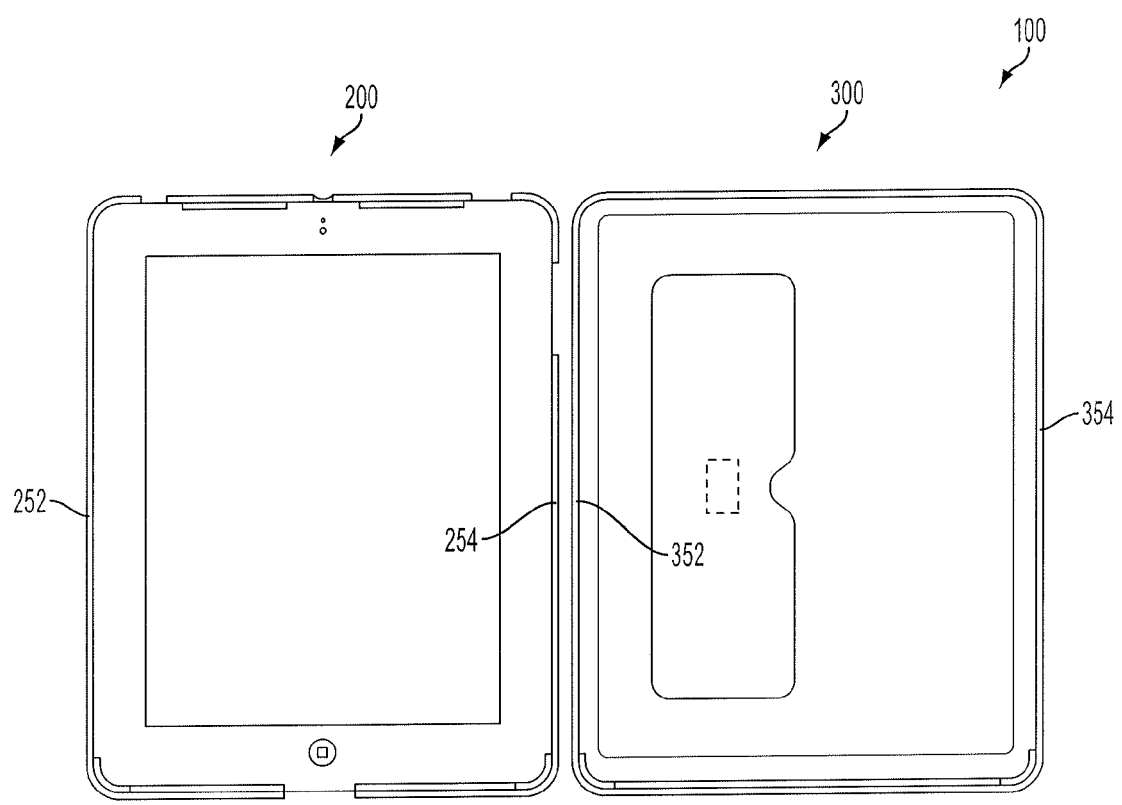
FIG. 5F illustrates the case in FIG. 5E opened and holding the tablet according to one implementation of the present disclosure.

FIG. 5F shows that when opened flat from the left side 252, the case 100 opens such that the holding shell 200 is disposed to the left of the cover shell 300. In other words, the right side 254 of the holding shell 200 meets the left side 352 of the cover shell 300.

The straps 450 are made of material which is strong and durable to connect the holding shell 200 and the cover shell 300, yet flexible enough to allow the strap hinge 400 to open in the various ways described. Further, the straps 450 are made of material which effectively grips the back side 250 and the back side 350. The holding shell 200 and the cover shell 300 are made of the same or similar materials which provide effective protection of the tablet 150. For example, if the holding shell 200 and the cover shell 300 were made of polycarbonate, the straps 450 may be made of polyurethane, which grips onto the polycarbonate better than many other available materials.

The first surfaces 510 and the second surfaces 520 may have similar colors or patterns or may have different colors or patterns. Because the first surfaces 510 or the second surfaces 520 are exposed depending on how the strap hinge 400 is opened, the user is advantageously provided an option for changing the color or pattern of the case 100. The user may desire the color/pattern of the first surface 510 to adorn the case 100. If the user changes his mind, the user may instead opt for the color/pattern of the second surface 520 to adorn the case 100. In this way, the user may flips the color scheme of the case 100 without swapping parts or otherwise manipulating the case 100 beyond the normal use of opening the strap hinge 400.

FIG. 6 illustrates a kickstand 600, which may correspond to the kickstand 330 in FIG. 3, in an open position. The kickstand 600 pivots out from the inner side 360 of the cover shell 300 at a pivot edge 640. An indent 362 in the inner side 360 houses the kickstand 600 when the kickstand 600 is retracted. A magnet 610 in the kickstand 600 attaches to a magnet 364 in the inner side 360 to hold the kickstand 600 closed. The magnet 610 may be centrally located with respect to the kickstand 600 in order to evenly hold down the kickstand 600. Other mechanisms (e.g., an adhesive such as Velcro®) for holding the kickstand 600 may be utilized.

A notch 630 opposite the pivot edge 640 provides a handle to open the kickstand 600. The kickstand 600 may open and pivot away from the inner side 360 along the pivot edge 640 until stopped by small straps 620. The small straps 620, which may be made of nylon or other suitably durable material, stop the kickstand 600 at a predetermined angle. When the case 100 is propped up or tilted against the kickstand 600 and the right side 354, the tablet 150 is held at a typing angle.

Figure 7A:
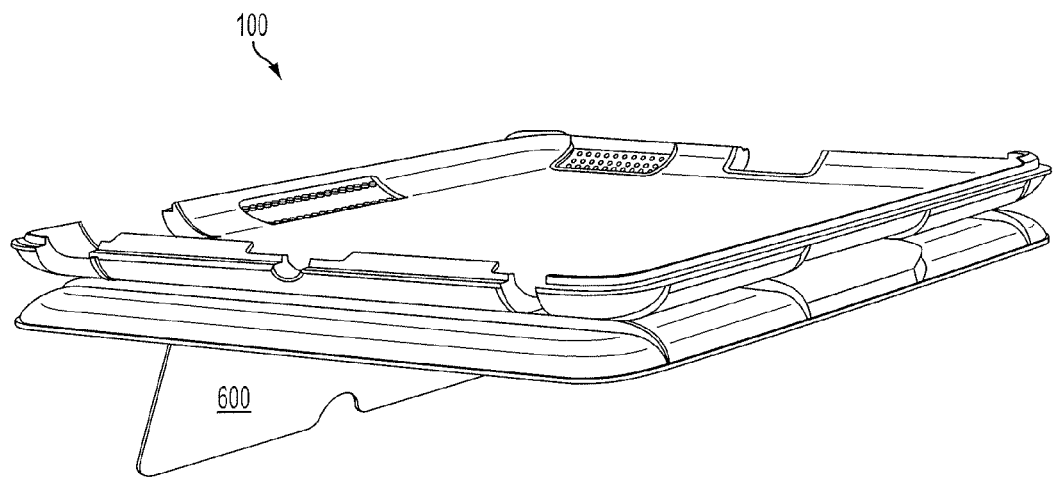
FIG. 7A illustrates the kickstand supporting the case in a typing angle according to one implementation of the present disclosure.
Figure 7B:
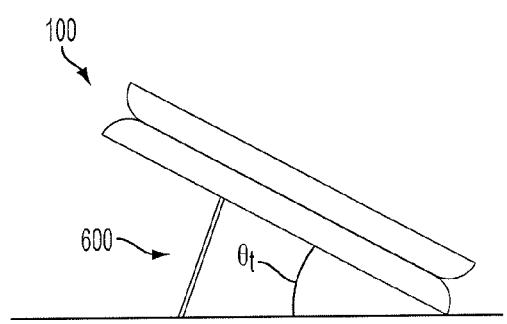
FIG. 7B illustrates a side view of the typing angle according to one implementation of the present disclosure.

FIG. 7A depicts the case 100 (without the tablet 150) supported by the kickstand 600 at the typing angle. The typing angle allows a user to type on a virtual keyboard on the screen 155 of the tablet 150 while viewing the screen 155. The typing angle is low enough to allow the user to reasonably rest his hands along a portion of the screen 155, while high enough so that the user is not forced to look straight down or otherwise position himself or herself uncomfortably to be able to view the screen 155. For example, the typing angle $\theta_t$ may be 45 degrees, as seen in FIG. 7B.

Figure 8A:
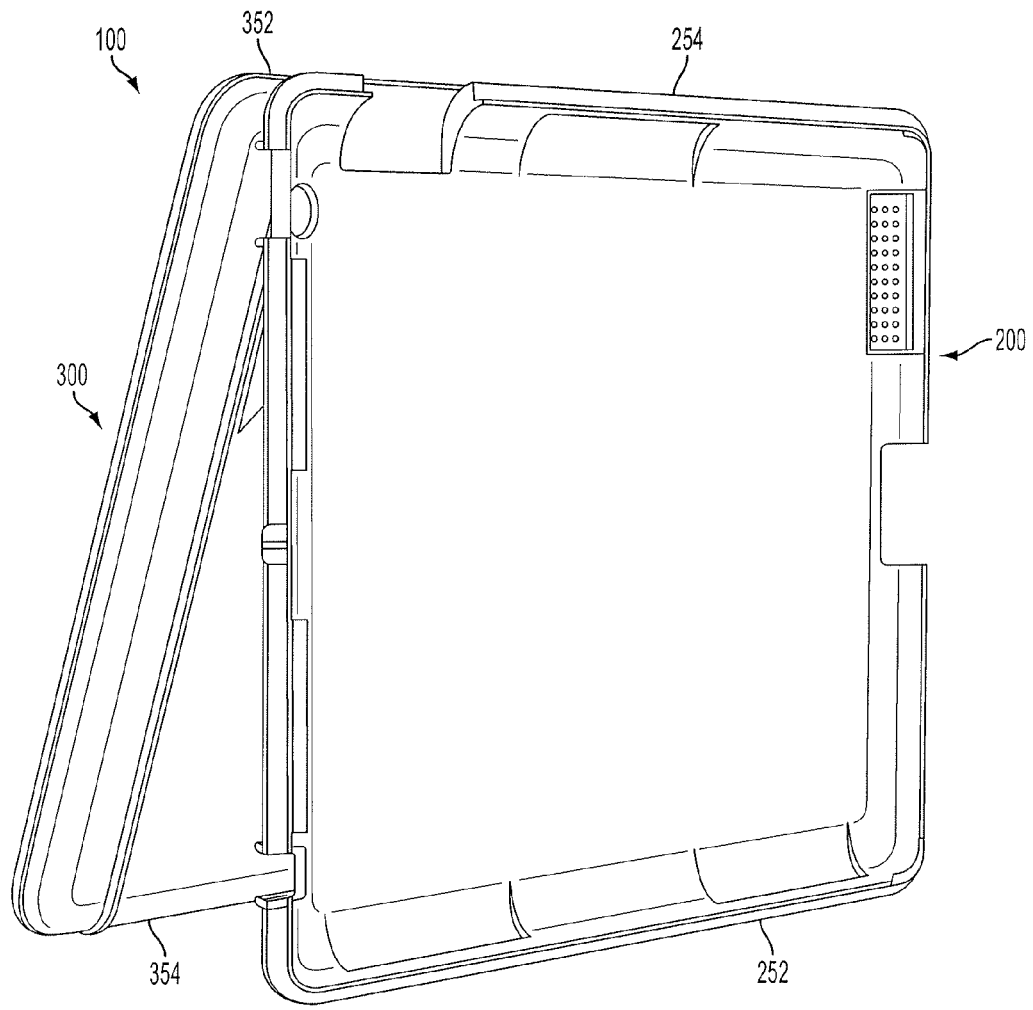
FIG. 8A illustrates the case in a viewing angle according to one implementation of the present disclosure.
Figure 8B:
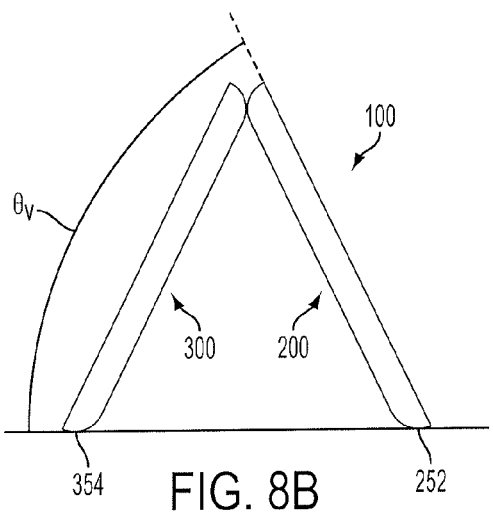
FIG. 8B illustrates a side view of the viewing angle according to one implementation of the present disclosure.

FIG. 8A illustrates the case 100 oriented to provide a viewing angle for the tablet 150 (not shown in FIG. 8A). In FIG. 8A, the case 100 is propped up or tilted against the left side 252 of the holding shell 200 and the right side 354 of the cover shell 300. The case 100 may also be propped up or tilted against the right side 254 of the holding shell 200 and the left side 352 of the cover shell 300 if opened the other way. In this mode, the case 100 provides a viewing angle $\theta_v$, for instance 60 degrees in FIG. 8B, which allows the user to view the screen 155. The flexibility of the strap hinge 400 further allows the viewing angle to be adjusted to the user's needs.

The dimensions and materials discussed herein are only an example and are not intended to limit the scope of the disclosure. Indeed, one of ordinary skill in the art will recognize that the dimensions possible are limitless.

Certain implementations have been disclosed to clarify the concepts including the above structural configurations. However, one skilled in the art will recognize that an endless number of implementations may be performed with the concepts herein.

Unless otherwise indicated, all numbers expressing quantities of ingredients, volumes of fluids, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or implementations of the disclosure disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain implementations of this disclosure are described herein, including the best mode known to the inventors for carrying out the disclosure. Of course, variations on these described implementations will become apparent to those of ordinary skill in the art upon reading the foregoing description. The inventor expects skilled artisans to employ such variations as appropriate, and the inventors intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Furthermore, certain references have been made to patents and printed publications throughout this specification. Each of the above-cited references and printed publications are individually incorporated herein by reference in their entirety.

Specific implementations disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Implementations of the disclosure so claimed are inherently or expressly described and enabled herein.

In closing, it is to be understood that the implementations of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

What is claimed is:

1. A case for a mobile device comprising:
   a holding shell configured to hold a mobile device and to cover an outer surface of the mobile device and having a top side, a bottom side, a left side, a right side, a back side, a plurality of rails on the back side spanning from the left side to the right side, and a plurality of grooves along the left side and the right side;
   a cover shell configured to cover a screen of the mobile device and having a left side, a right side, a back side, a plurality of rails on the back side spanning from the left side to the right side, and a plurality of grooves along the left side and the right side; and
   a plurality of straps forming a strap hinge between the holding shell and the cover shell, wherein each of the plurality of straps attaches into one of the plurality of grooves along the left side or the right side of the holding shell and attaches into a corresponding one of the plurality of grooves along the left side or the right side of the cover shell such that the strap hinge can be opened from the left side of the holding shell or the right side of the holding shell when the back side of the holding shell faces the back side of the cover shell, and each of the plurality of straps configured to fit between two of the plurality of rails on the back side of the holding shell or the cover shell and the plurality of straps alternates between attaching to the left sides of the holding shell and the cover shell and the right sides of the holding shell and the cover shell;
   wherein the holding shell further comprises at least one opening passing through a surface of the holding shell for exposing at least a portion of the outer surface of the mobile device; and
   wherein the holding shell defines a cavity for the mobile device to be inserted into, and the left side, the right side, the top side, and the bottom side of the holding shell are each configured to cover a respective outer surface of the mobile device when the mobile device is inserted into the cavity, and the holding shell has at least one lip extending from at least one of the left side, the right side, the top side, or the bottom side of the holding shell for extending over at least a portion of the mobile device for securing the mobile device within the cavity.

2. The case of claim 1, wherein a first surface of the plurality of straps is exposed when the strap hinge is opened from the left side of the holding shell and a second surface of the plurality of straps is exposed when the strap hinge is opened from the right side of the holding shell.

3. The case of claim 2, wherein the first surface has a different color than the second surface.

4. The case of claim 1, wherein a shape of the holding shell mirrors a shape of the cover shell.

5. The case of claim 1, wherein each of the plurality of straps is configured to fit between two of the plurality of rails on the back side of the holding shell or the cover shell.

6. A case for a mobile device comprising:
   a holding shell configured to hold a mobile device and to cover an outer surface of the mobile device and having a left side, a right side, a back side, a plurality of rails on the back side spanning from the left side to the right side, and a plurality of grooves along the left side and the right side;
   a cover shell configured to cover a screen of the mobile device and having a left side, a right side, a back side, a plurality of rails on the back side spanning from the left side to the right side, and a plurality of grooves along the left side and the right side; and
   a plurality of straps forming a strap hinge between the holding shell and the cover shell, wherein each of the plurality of straps attaches into one of the plurality of grooves along the left side or the right side of the holding shell and attaches into a corresponding one of the plurality of grooves along the left side or the right side of the cover shell such that the strap hinge can be opened from the left side of the holding shell or the right side of the holding shell when the back side of the holding shell faces the back side of the cover shell, each of the plurality of straps configured to fit between two of the plurality of rails on the back side of the holding shell or the cover shell, and the plurality of straps alternates between attaching to the left sides of the holding shell and the cover shell and the right sides of the holding shell and the cover shell;
   wherein the holding shell further comprises at least one opening passing through a surface of the holding shell for exposing at least a portion of the outer surface of the mobile device; and
   wherein the holding shell defines a cavity for the mobile device to be inserted into, and the left side and the right side of the holding shell are each configured to cover a respective outer surface of the mobile device when the mobile device is inserted into the cavity, and the holding shell has at least one lip extending from at least one of the left side or the right side of the holding shell for extending over at least a portion of the mobile device for securing the mobile device within the cavity.

7. The case of claim 6, wherein a first surface of the plurality of straps is exposed when the strap hinge is opened from the left side of the holding shell and a second surface of the plurality of straps is exposed when the strap hinge is opened from the right side of the holding shell.

8. The case of claim 7, wherein the first surface has a different color than the second surface.

9. The case of claim 6, wherein a shape of the holding shell mirrors a shape of the cover shell.

10. The case of claim 6 further comprising a kickstand attached to the cover shell.

11. A case for a mobile device comprising:
- a holding shell configured to hold a mobile device and to cover an outer surface of the mobile device and having a left side, a right side, a back side, a plurality of rails on the back side spanning from the left side to the right side, and a plurality of grooves along the left side and the right side;
- a cover shell configured to cover a screen of the mobile device and having a left side, a right side, a back side, an inner side facing opposite the back side, a plurality of rails on the back side spanning from the left side to the right side, a plurality of grooves along the left side and the right side;
- a kickstand attached to the inner side of the cover shell by a kickstand hinge; and
- a plurality of straps forming a strap hinge between the holding shell and the cover shell, wherein each of the plurality of straps attaches into one of the plurality of grooves along the left side or the right side of the holding shell and attaches into a corresponding one of the plurality of grooves along the left side or the right side of the cover shell such that the strap hinge can be opened from the left side of the holding shell or the right side of the holding shell when the back side of the holding shell faces the back side of the cover shell, and each of the plurality of straps configured to fit between two of the plurality of rails on the back side of the holding shell or the cover shell and the plurality of straps alternates between attaching to the left sides of the holding shell and the cover shell and the right sides of the holding shell and the cover shell;
- wherein the holding shell further comprises at least one opening passing through a surface of the holding shell for exposing at least a portion of the outer surface of the mobile device; and
- wherein the holding shell has at least one lip extending from at least one of the left side or the right side of the holding shell for securing the mobile device.

12. The case of claim 11, wherein the inner side of the cover shell includes a kickstand indent for receiving the kickstand in a closed position.

13. The case of claim 11, wherein at least one small strap prevents the kickstand from opening beyond a desired angle.

14. The case of claim 11, wherein the kickstand in an open position supports the mobile device at a typing angle of 45 degrees or less.

15. The case of claim 11, wherein the kickstand is held in a closed position by a magnet.

16. The case of claim 15, wherein the magnet is disposed in an approximate center of the kickstand.

17. The case of claim 1, wherein the at least one opening is a cutout portion of the holding shell.

18. The case of claim 1, wherein the at least one lip is at least one of a corner lip or an edge lip.

19. The case of claim 6, wherein the at least one opening is a cutout portion of the holding shell.

20. The case of claim 6, wherein the at least one lip is at least one of a corner lip or an edge lip.

* * * * *